US012483657B2

United States Patent
Griffin et al.

(10) Patent No.: US 12,483,657 B2
(45) Date of Patent: Nov. 25, 2025

(54) RECEIVER SIDE NOISE REDUCTION AND SPEECH ENHANCEMENT FOR PSTN CALLERS

(71) Applicant: Cisco Technology, Inc., San Jose, CA (US)

(72) Inventors: Keith Griffin, County Galway (IE); Samer Lutfi Hijazi, San Jose, CA (US); Raul Alejandro Casas, Doylestown, PA (US); Yusuf Ziya Isik, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 17/749,317

(22) Filed: May 20, 2022

(65) Prior Publication Data

US 2023/0421701 A1    Dec. 28, 2023

(51) Int. Cl.
*H04M 3/56* (2006.01)
(52) U.S. Cl.
CPC ........... *H04M 3/568* (2013.01); *H04M 3/567* (2013.01)
(58) Field of Classification Search
None
See application file for complete search history.

(56) References Cited

U.S. PATENT DOCUMENTS

| 7,225,001 | B1 | 5/2007 | Ericsson |
| 11,756,525 | B1* | 9/2023 | Xu .................. H04M 3/568 |
| | | | 381/71.1 |
| 2009/0016333 | A1 | 1/2009 | Wang |
| 2011/0205915 | A1 | 8/2011 | Skrabutenas |
| 2020/0112600 | A1* | 4/2020 | Hodgkinson ......... H04L 1/0047 |
| 2022/0270625 | A1* | 8/2022 | Dai ..................... G10L 25/21 |
| 2023/0068099 | A1* | 3/2023 | Abramenko ........ G10L 21/0364 |

FOREIGN PATENT DOCUMENTS

KR    100772199 B1    11/2007

OTHER PUBLICATIONS

Hunt, G. and Arden, P., "QoS requirements for a voice-over-IP PSTN", BT Technology Journal, vol. 23 No 2, Apr. 2005, pp. 37-47.
Singh, K., "Speech Enhancement Based on Noise Reduction", University of Rochester, 2014, http://www2.ece.rochester.edu/~zduan/teaching/ece472/projects/2014/Singh_Gu_SpeechEnhancementBasedOnNoiseReduction.pdf, 5 pages. Accessed May 17, 2022.

\* cited by examiner

*Primary Examiner* — Antim G Shah
(74) *Attorney, Agent, or Firm* — Lee & Hayes, P.C.; James M. Behmke

(57) ABSTRACT

In one embodiment, an illustrative method herein may comprise: receiving, at a receiver, an audio codec stream; determining, by the receiver, a length of time associated with a look-ahead buffer of the audio codec stream; inputting, by the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and outputting, by the receiver, the enhanced audio codec stream.

20 Claims, 10 Drawing Sheets

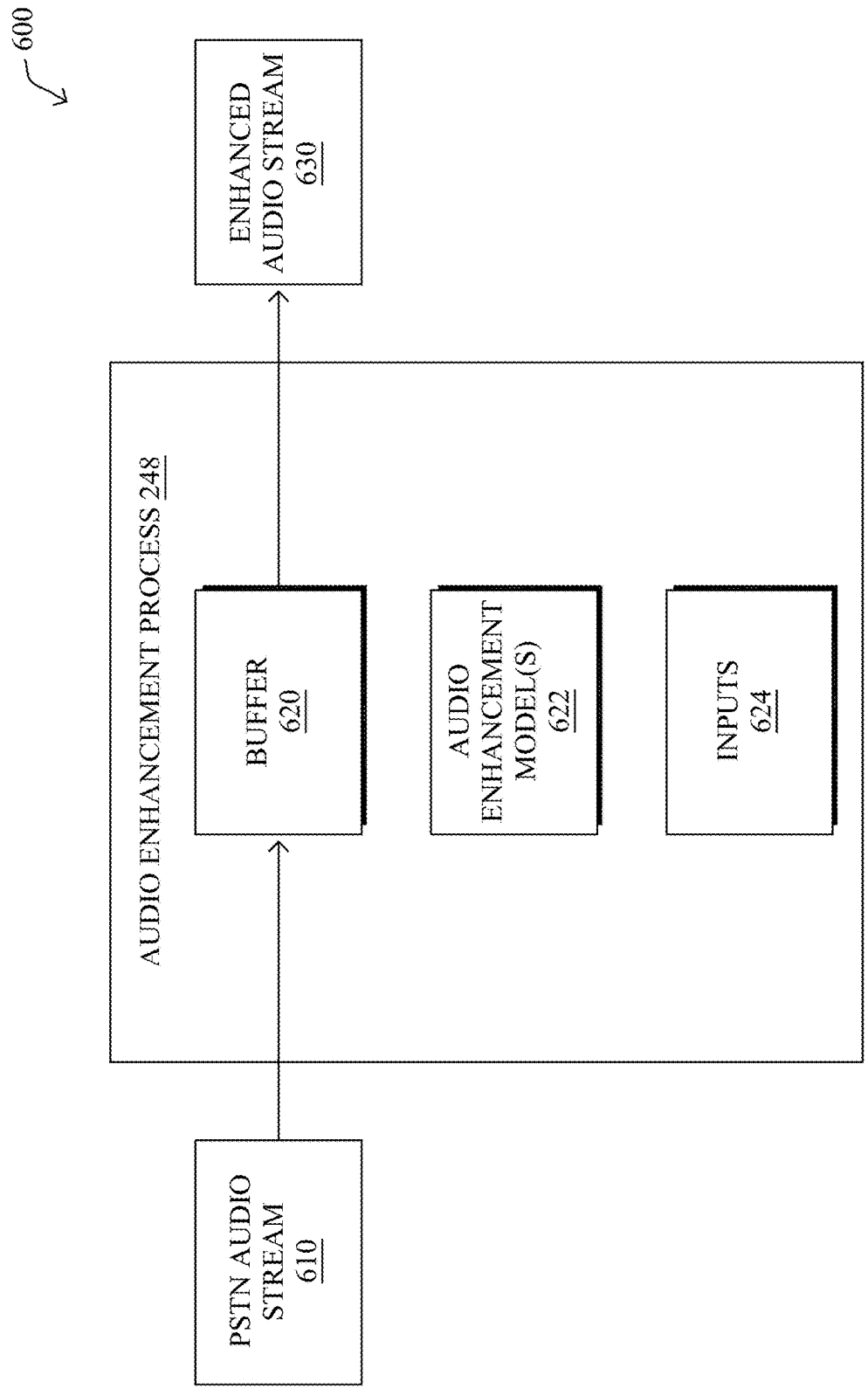

RECEIVER SIDE NOISE REDUCTION AND SPEECH ENHANCEMENT FOR PSTN CALLERS

TECHNICAL FIELD

The present disclosure relates generally to computer networks, and, more particularly, to receiver side noise reduction and speech enhancement for public switched telephone network (PSTN) callers.

BACKGROUND

Public switched telephone network (PSTN) callers, particularly from cellphones, often generate background noise in online meetings, such as, for instance, calling into a meeting from a cab in an urban area. Background noise removal (BNR) has played a huge role in enabling inclusive collaboration by reducing noise anxiety for callers and improving the experience for all attendees. However, while BNR is a largely solved problem for removing noise at the sender side, this is not an option for PSTN callers. In particular, there is little or no processing for the sender side of PSTN, and the available processing budget to run BNR on PSTN servers is close to zero, thus insufficient to run BNR at the scale required for conferencing services.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates a simplified example of receiver side noise reduction and speech enhancement for PSTN callers;

DESCRIPTION OF EXAMPLE EMBODIMENTS

Overview

According to one or more embodiments of the disclosure, an illustrative method herein may comprise: receiving, at a receiver, an audio codec stream; determining, by the receiver, a length of time associated with a look-ahead buffer of the audio codec stream; inputting, by the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and outputting, by the receiver, the enhanced audio codec stream.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
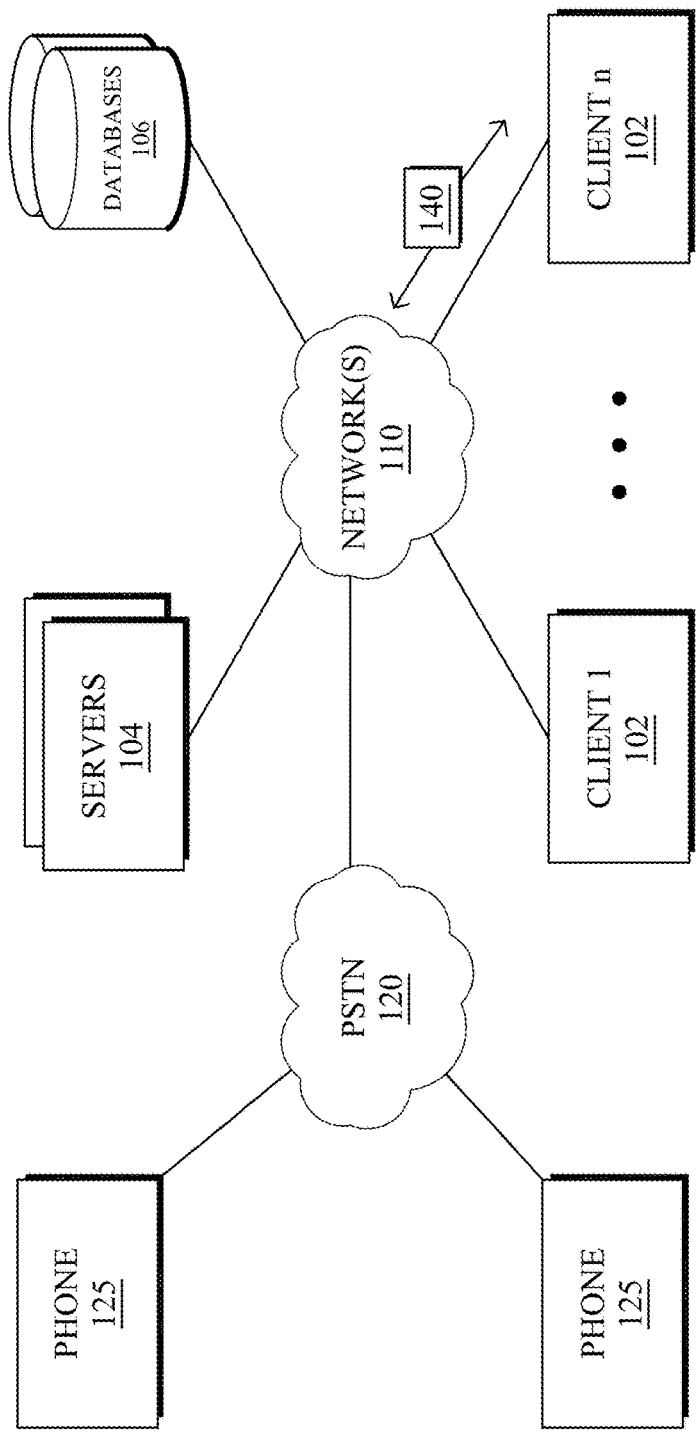
FIG. 1 illustrates an example communication network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN) 120 may also be considered to be a part of computing system 100, namely where phones 125 connect to the PSTN 120 in a standard manner (e.g., landlines, cellphones, and so on). The PSTN may be based on any number of carrier telephone networks which provide a connection to computer network 110 for things such as conference calls, video calls, calls to voice over IP (VoIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
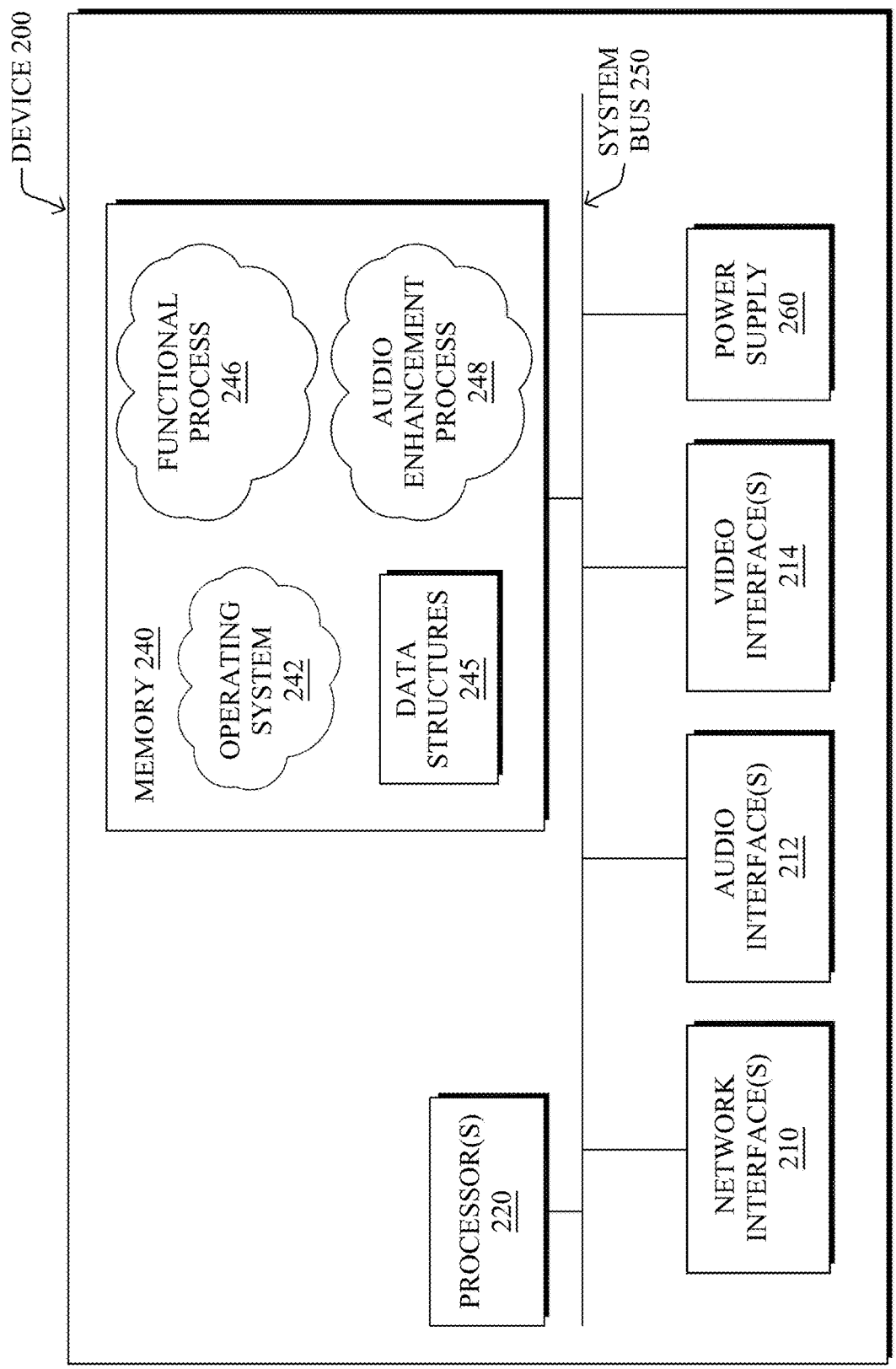
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may also be any other suitable type of device depending upon the type of network architecture in place, such as a collaboration endpoint, "receiver" (herein), etc. Device 200 may comprise one or more network interface 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via network interfaces 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative audio enhancement process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, functional process 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via network interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
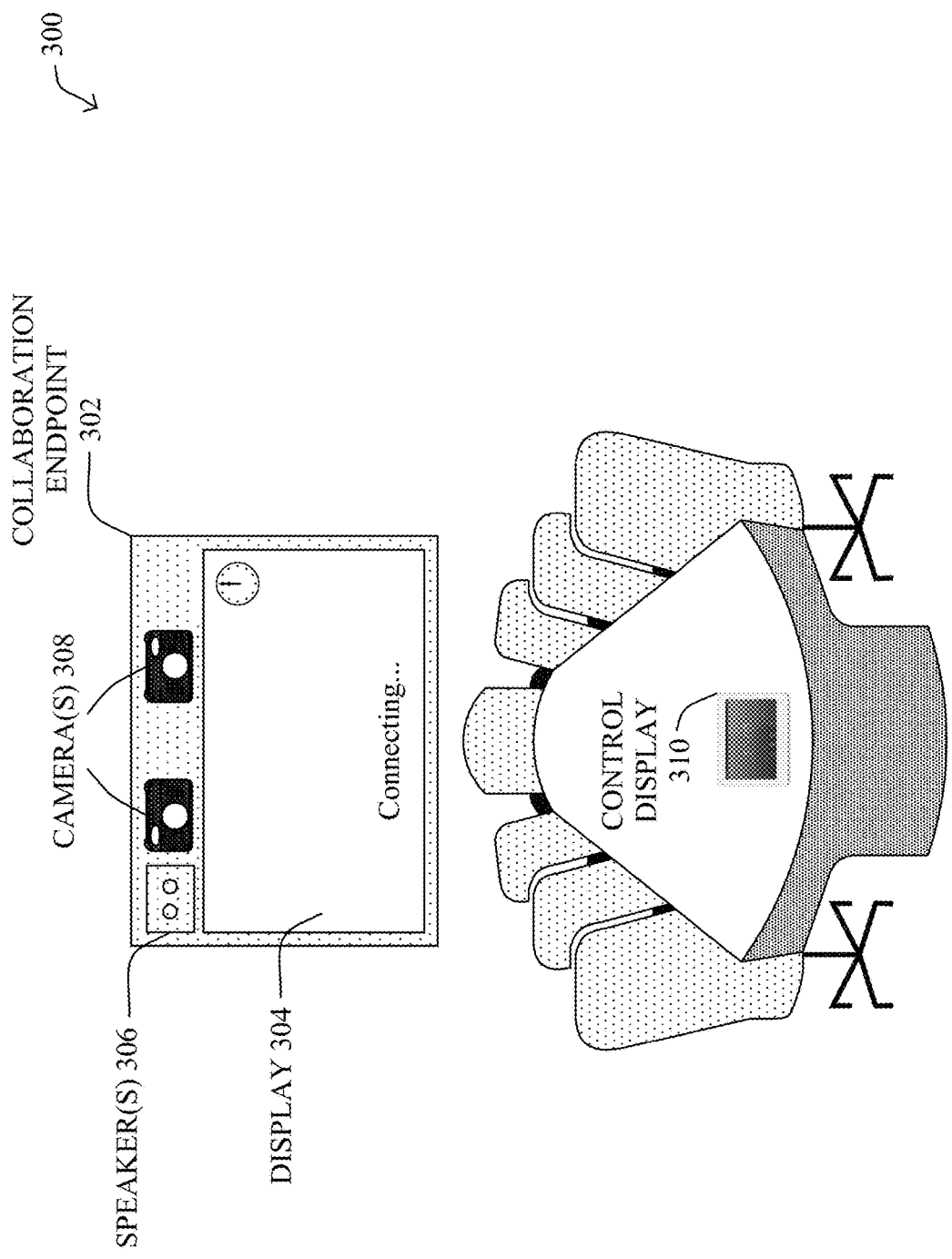
FIG. 3 illustrates various example components of an illustrative videoconferencing system.

For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
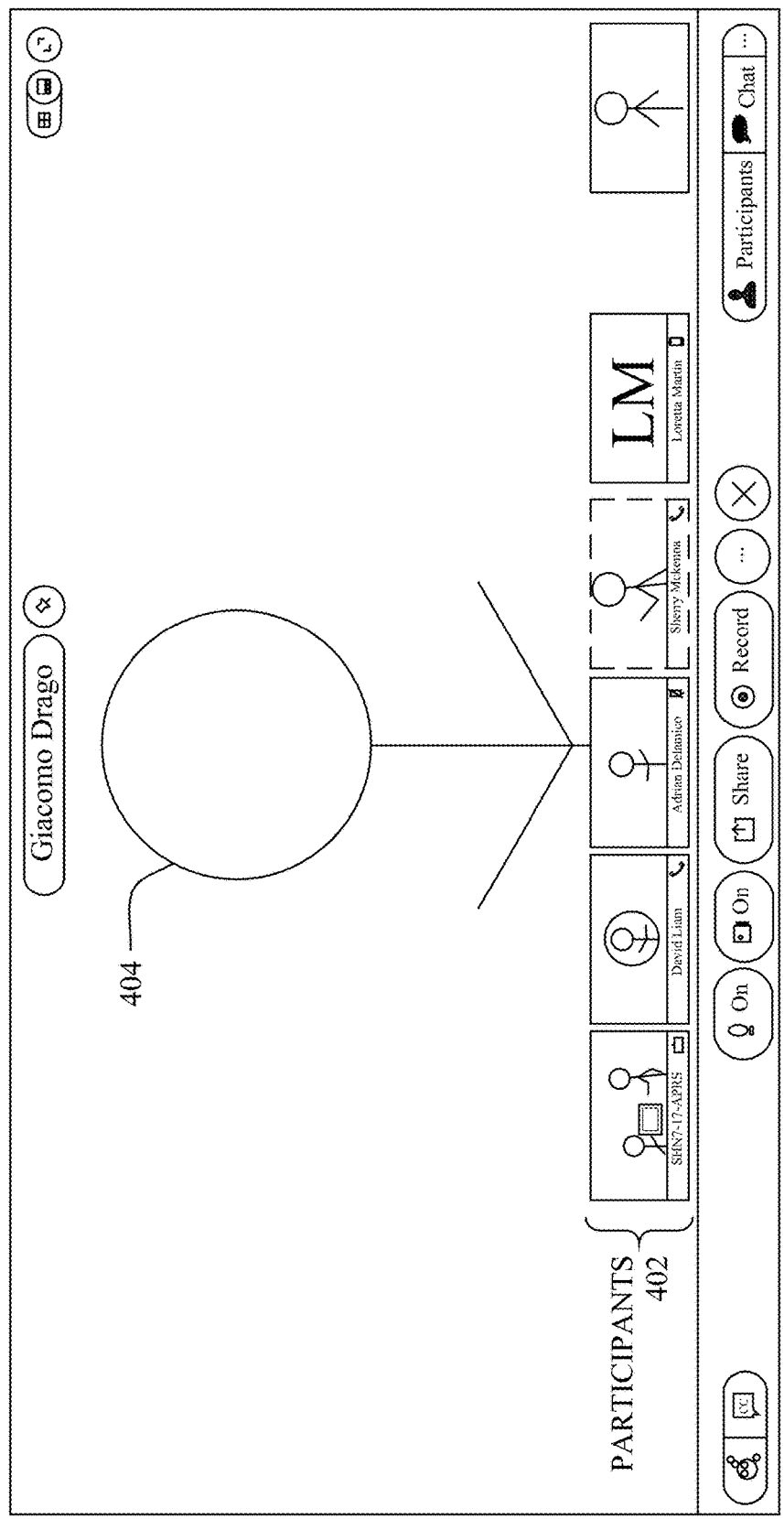
FIG. 4 illustrates an example display of a virtual meeting (or a videoconference)

In addition, FIG. 4 illustrates an example display 400 of a virtual meeting (or a videoconference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

Other styles, configurations, and operations of web conferences, presentations, calls, and so on may be understood by those skilled in the art, and those shown and described above are merely examples that are not meant to be limiting to the scope of the present disclosure.

Receiver Side Noise Reduction and Speech Enhancement for PSTN

As noted above, background noise removal (BNR) has improved the experience of conference calls for all attendees. However, as also noted above, BNR is traditionally based on removing noise at the sender side, which is not an option for public switched telephone network (PSTN) callers (e.g., cellphones).

The techniques herein, therefore, provide an efficient solution receiver side noise reduction and speech enhancement for PSTN callers. Specifically, according to one or more embodiments of the disclosure as described in detail below, an illustrative method herein may comprise: receiving, at a receiver, an audio codec stream; determining, by the receiver, a length of time associated with a look-ahead buffer of the audio codec stream; inputting, by the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and outputting, by the receiver, the enhanced audio codec stream.

Illustratively, the techniques described herein may be performed by hardware, software, and/or firmware, such as in accordance with the audio enhancement process 248, which may include computer executable instructions executed by the processor 220 to perform functions relating to the techniques described herein, e.g., in conjunction with other processes, such as conferencing processes, etc.

Notably, the techniques herein may employ any number of machine learning (ML) and/or artificial intelligence (AI) techniques, such as to enhance audio based on one or more audio enhancement models, as described herein. In general, machine learning is concerned with the design and the development of techniques that receive empirical data as input (e.g., audio streams, herein), recognize complex patterns in the input data, and optionally make adjustments to the data (e.g., enhancing the data, filling in missing data, changing the data, etc.). For example, some machine learning techniques use an underlying model, which is trained to perform certain operations (e.g., classifying data, adjusting data, and so on). A learning process adjusts parameters of the model such that after this optimization/learning phase, the model can be applied to input data sets to perform the desired functionality.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, deep neural networks (DNNs), or the like.

Operationally, the techniques herein are based on receiver side audio enhancement to incoming PSTN audio codec streams. Illustratively, the techniques herein may be implemented by a central conference server (e.g., Webex servers), or else by client-based conference applications (e.g., a local Webex app) who wish to add receiver side background noise removal (or other audio enhancements). (Note that for compute efficiency, the techniques herein may be activated only when PSTN callers are present in a meeting or call.)

Figure 5:
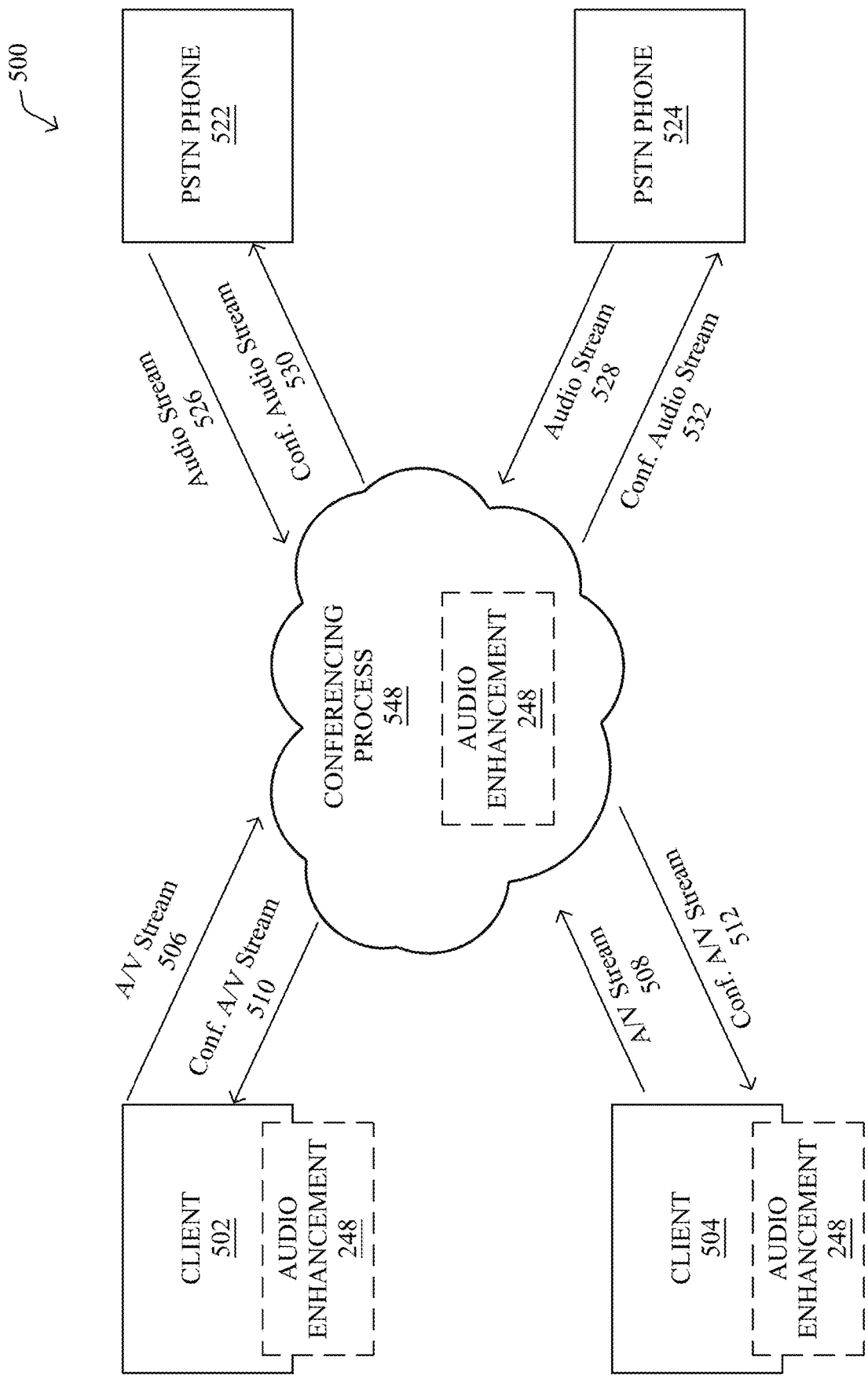
FIG. 5 illustrates an example architecture for a conference service with public switched telephone network (PSTN) callers.

FIG. 5 illustrates an example architecture 500 for receiver side noise reduction and speech enhancement for PSTN callers, according to various embodiments. At the core of architecture 500 is conferencing process 548, which may be executed by a device that provides a conferencing (web conference, call, virtual meeting, etc.) service in a network, or another device in communication therewith. Additionally, as shown, architecture 500 may include a first client 502 and a second client 504 that operate in conjunction with one another and videoconferencing process 548. Moreover, one or more PSTN phones 522 and 524 may also call in to the conference, as will be understood by those skilled in the art (e.g., the PSTN providers connect to an OPUS-based system to convert the signals into OPUS codec encoding, etc.).

For purposes of illustration, assume that client 502, client 504, phone 522, and phone 524 are operated by participants (e.g., end users) of the conference. Each of client 502 and client 504 may generate and send audio-video streams 506, 508 to conferencing process 548, where audio-video streams 506, 508 include video captured by a corresponding camera of the clients (e.g., a video of the participant) as well as audio captured by a corresponding microphone of the clients (e.g., a sound recording of the participant). PSTN phone 522 and PSTN phone 524, on the other hand, send audio codec streams 526 and 528 to conferencing process (e.g., via a PSTN provider, as mentioned above).

Subsequent to receiving audio-video streams 506, 508, as well as the audio codec streams 526, 528, the conferencing process 548 may be configured to generate and send conference A/V streams 510, 512 to, respectively, client 502 and client 504, where conference streams 510, 512 may be used by the clients to display a virtual meeting (or a conference), for example, as described with respect to FIG. 4. Also, the conferencing process 548 may be configured to generate and send conference audio streams 530, 532 to, respectively, phone 522 and phone 524, where conference audio streams 530, 532 may be used by the phones to allow a user to listen to virtual meeting (or a conference), accordingly.

As described herein, audio enhancement process 248 may, after receiving PSTN-based audio codec streams 526, 528, etc., may modify/enhance the received audio (at the receiver side of the audio) such that the recipient's audio (whether of an A/V stream 510, 512 for a client 502, 504, or an audio stream returned to another PSTN phone 522 or 524) includes the enhanced audio. As mentioned herein, the process 248 may be on the conference process 548 (e.g., on a conference server), or may be on an end client 502, 504, depending upon configuration, implementation, and so on.

In particular, with reference now to example 600 of FIG. 6, simplified details regarding audio enhancement (audio enhancement process 248) herein are shown. As shown, audio enhancement process 248 may include any or all of the following components: a buffer 620, audio enhancement model(s) 622, and one or more inputs 624. As would be appreciated, the functionalities of these components may be combined or omitted, as desired, and other configurations may be made to achieve the same or similar result, herein.

As described in greater detail below, audio enhancement process 248 may operate to receive PSTN audio streams 610 (e.g., audio codec streams 526, 528 above) from PSTN phones, which enter a buffer 620 prior to being output. While in the buffer, the audio enhancement process 248 has a particular amount of time (e.g., determined and/or variably set) to apply one or more audio enhancement models 622 to the PSTN audio codec stream (e.g., based on one or more inputs 624, such as from an administrative configuration, local receiver configuration, local receiver input sound, and so on, as detained further below). The audio enhancement model 622 may thus apply any number of audio enhancements to the incoming stream 610 (e.g., noise reduction, wideband filling/bandwidth extension, artifact rectification, packet loss concealment, or other filters) to produce the enhanced audio stream 630 for output, accordingly.

One of the advantages of receiver-side PSTN de-noising is to perform it in conjunction with other audio enhancements, such as PSTN Wideband filling/bandwidth extension, PSTN artifact rectification, and packet loss concealment at the same time. (Note that end-to-end packet loss concealment can only be performed on the receiver side, hence PSTN rectification can benefit from the synergy of performing these three functions at the same location.) Moreover, given that on the same call there may be callers coming over different CODECs such as OPUS low bitrate. The same compute resources on the receiver can thus be allocated to rectify other CODECs artifacts one at a time, e.g., depending on which stream has speech activity.

In addition to the advantages mentioned above, receiver side enhancement allows further customizing of the audio enhancements, such as based on the hearing characteristics of the listener on the receiver side. For instance, the techniques herein can create hearing profiles for specific users (e.g., high frequency increase) based on user inputs, user-based audio testing/feedback, and so on. These hearing profiles may then be used as an input to audio enhancement model (e.g., a low bit-rate CODECs artifact rectifier, bandwidth extension, and speech enhancement system) to adjust the behavior of the model(s) according to the listener capabilities.

Furthermore, as the system herein has access to the microphone input at the receiver side, the techniques herein can create an instantaneous acoustic background profile (e.g., noise and reverberation), which could be used to tailor the output audio of these systems to counteract the impairment the environment is imposing to improve intelligibility in challenging environments.

Again, all of these synergistic functionalities can be performed using the same compute resources (e.g., a single audio enhancement model) on the receiver. (Note that while different models may be used herein, only one model need be applied to effectuate any number of audio enhancements to the incoming audio codec stream, as described herein.)

Figure 7A:
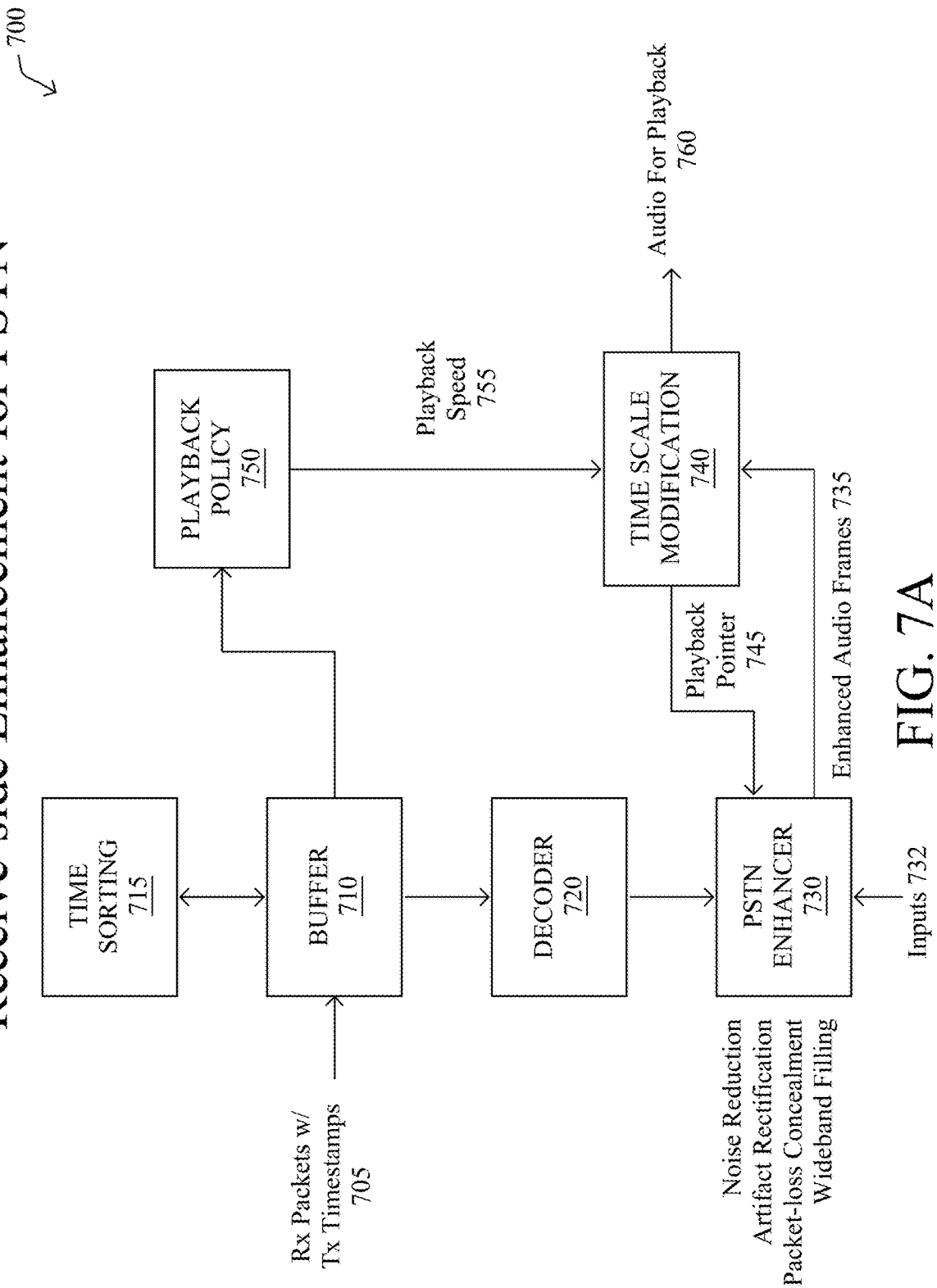
FIG. 7A illustrates another example of receiver side noise reduction and speech enhancement for PSTN callers.

FIG. 7A illustrates example detail of an architecture 700 for receive-side enhancements to PSTN according to one or more embodiments of the present disclosure. For instance, as shown, packets 705 are received (with a transmission timestamp) at a buffer 710. Buffer 710 performs time sorting 715, and sends the packets into decoder 720 to process the codec stream, accordingly. Once decoded, the stream is input into the PSTN enhancer 730 (e.g., audio enhancement process 248), where the audio enhancement model(s) may be applied, as described herein, to produce the enhanced audio frames 735, accordingly. Note that as described above, other inputs 732 (e.g., similar to inputs 624 above) may also be supplied to the PSTN enhancer 730, such as, e.g., instantaneous noise profile from a local microphone, listener profiles at the receiver side, etc. (Also, the decoder 720, in addition to the decoded audio frames, might also give some additional information/metadata to supply as an input, such as indicator flags for lost packets.)

Time scale modification 740 then processes the enhanced frames 735 based on receiving, from playback policy 750 (in coordination with the buffer 710), the appropriate playback speed 755. The processed frames 735 may then be output as audio for playback 760. Note also that a playback pointer 745 may be returned from the time scale modification 740 into the PSTN enhancer 730, such as to assist with determining a length of time allowed for processing the audio stream, as described below.

Figure 7B:
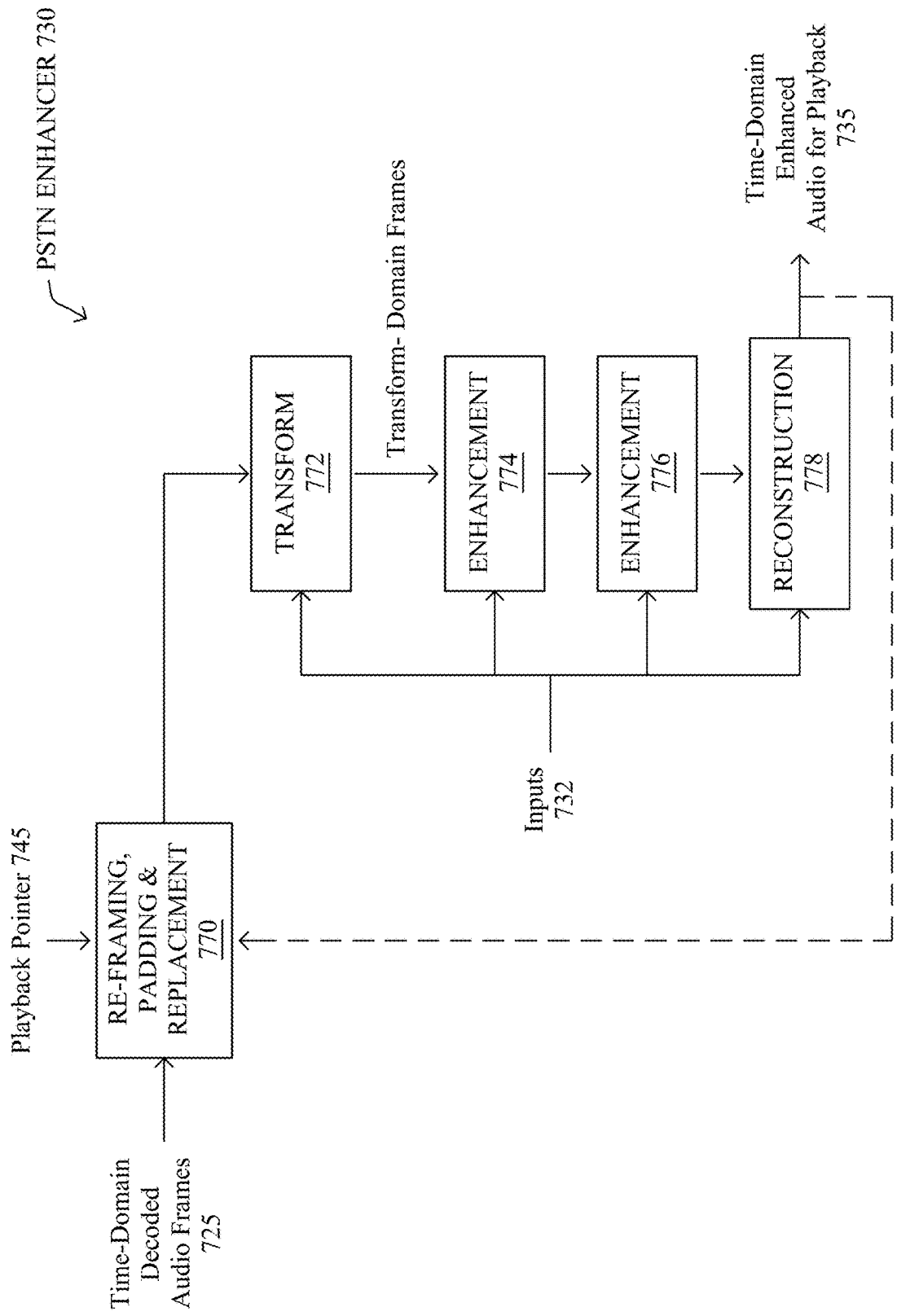
FIG. 7B illustrates an example of a PSTN enhancer.

In further detail, FIG. 7B illustrates a closer view of PSTN enhancer 730. For instance, time domain decoded audio frames 725 (from decoder 720 above) are received at a re-framing, padding, and replacement module 770 of the PSTN enhancer 730. The module 770 then processes the frames 725 through a transform 772 (into transform domain frames) for one or more enhancements 774, 776 to be applied (e.g., within a single audio enhancement model, as described above), then the frames go through reconstruction 778 to produce the time-domain enhanced audio for playback (enhanced audio frames 735, above), accordingly. (Note that those skilled in the art will appreciated that a transform may not be needed, such as where a transform=an identity function.) As mentioned above, according to the techniques herein, the inputs 732 (e.g., inputs 624) may also be used by one or more of 772, 774, 776, and 778 for production of the time-domain enhanced audio for playback, accordingly.

Another benefit of receiver-side audio enhancement is that buffering performed by a jitter buffer may be exploited to expand the number of "future" audio frames available for improved processing (i.e., longer time for audio enhancement processing to use frames ahead of playback as context for enhancement). That is, the latency introduced by a jitter buffer (e.g., buffer 620 above) is necessary at times to perform its function, and the techniques herein may take advantage (or control), accordingly.

In particular, a transmitter device (source of an audio stream) doesn't know the amount of latency/jitter in the transmission of its stream through the network, hence receivers incorporate a jitter buffer to control additional latency. Unlike transmission side processing, generally with no budget for delay (i.e., real-time), the techniques herein on the receiver side has specific knowledge of how much time can be spent processing an audio stream before needed for playback. Also, the more time there is to process, the better (e.g., more accurate) the enhancements can be (e.g., more time spent enhancing, more future context is used to enhance the current audio frame, etc.).

Figure 8:
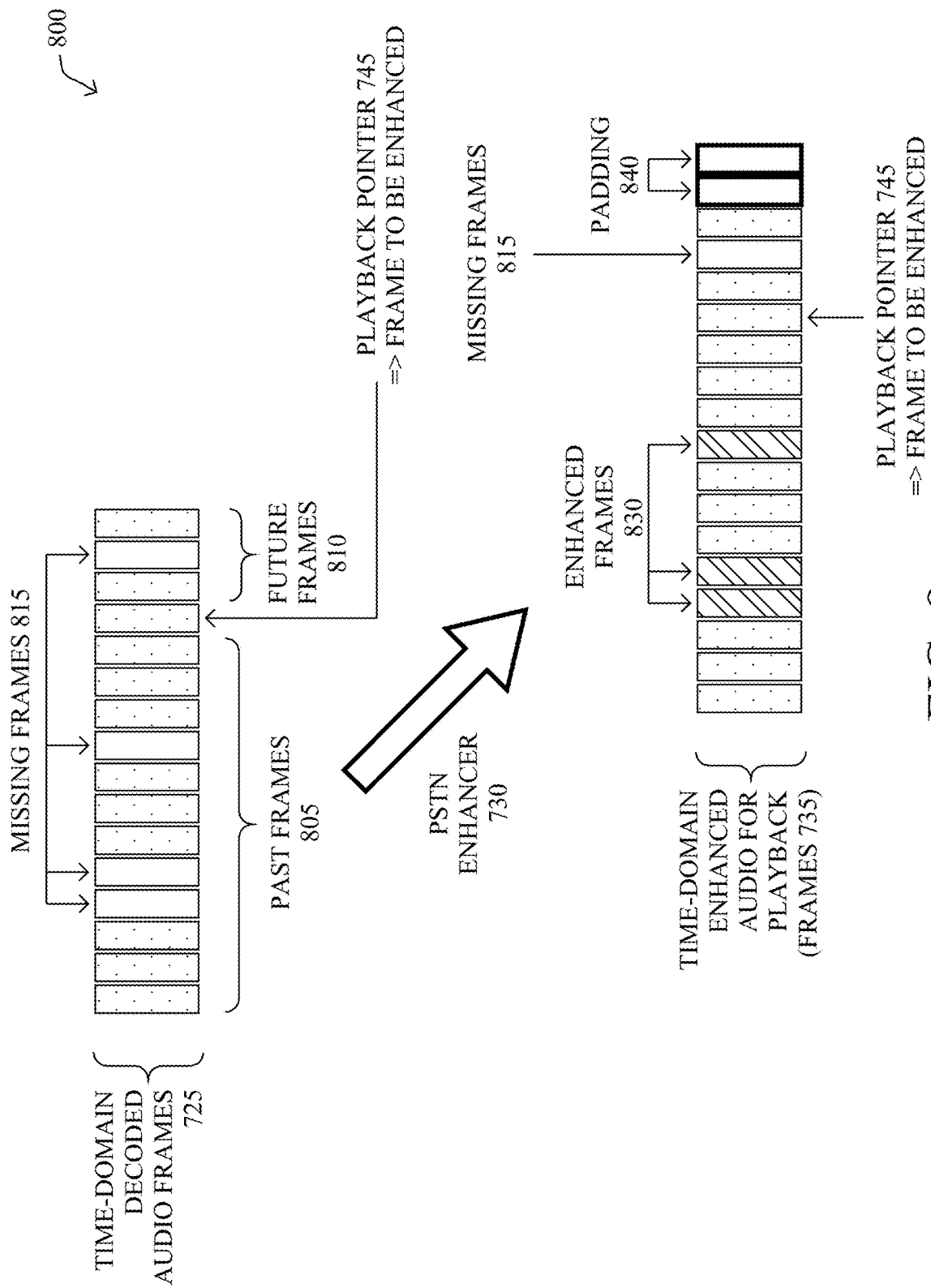
FIG. 8 illustrates an example of look-ahead buffer frames for receiver side noise reduction and speech enhancement for PSTN callers.

FIG. 8 details an example 800 of look-ahead buffer frames for receiver side noise reduction and speech enhancement for PSTN callers. Namely, general techniques today typically have a single or fixed look-ahead frame, whereas the techniques herein (particularly the PSTN enhancer 730/ audio enhancement model 622) can use any number of audio frames ahead of the frame marked for playback as context to enhance the playback frame (e.g., a dynamically determined number of frames based on jitter buffer content and available processing time; that is, a "dynamic look ahead" herein). As shown in FIG. 8, where the time-domain decoded audio frames 725 would traditionally have a number of missing frames 815 (in past frames 805 and future frames 810, separated by the current playback pointer 745, which is the frame to be enhanced), through the PSTN enhancer 730 herein, the time-domain enhanced audio for playback may provide enhanced frames 830, accordingly. Additional padding 840 may be adjusted based on the variable jitter buffer as noted above, allowing for increased (used and/or controlled) processing time herein.

Note that in one embodiment, where training of the audio enhancement model is performed offline, variable latency may be used as an input to the training, such that the model may behave differently based on an input of the current latency. This timing is, for example, in addition to inputs such as the number of functions to perform, the amount of noise in the stream to remove, the amount of loss to account for, and so on, so the model knows what may be necessary to meet the time constraints of the impending playback. Said differently, the processing time used by the speech enhancement module herein to process a given frame depends both on the complexity of the enhancement system and the CPU it runs on. Also, the techniques herein are interested in determining the future context (time) that the enhancement model is allowed to utilize. For example, assume that it is determined that to enhance the current frame, the model may also use the next 40 ms of speech data in the jitter buffer. Since, the amount of future frames in the jitter buffer may vary during test time (actual use in the product), the techniques herein may also train the system for a varying number of available future frames, and design the model such that it can dynamically change its future context to utilize (i.e., future audio frames (time) the model is allowed to use).

Figure 9:
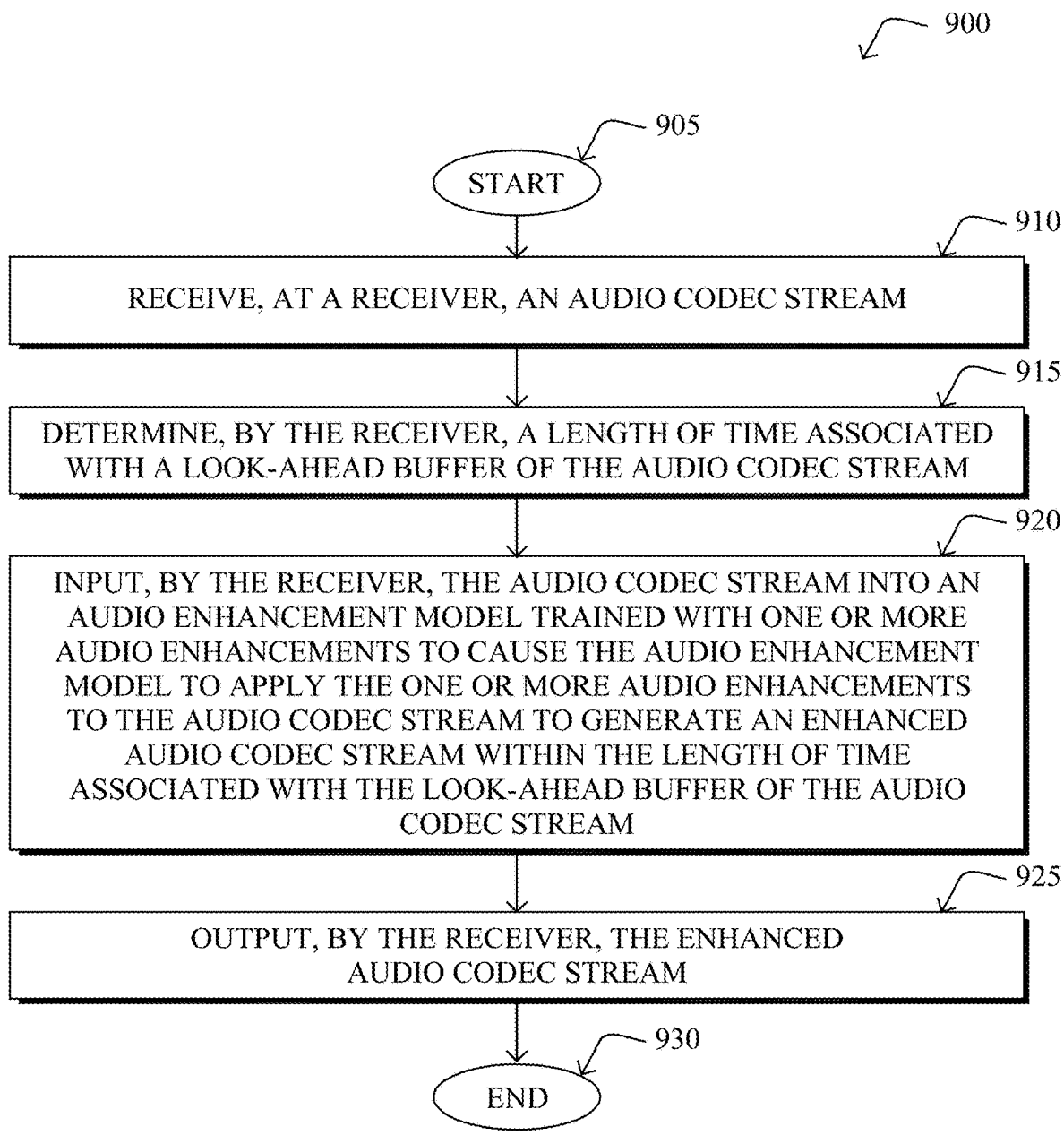
FIG. 9 illustrates an example simplified procedure for receiver side noise reduction and speech enhancement for PSTN callers in accordance with one or more embodiments described herein.

In closing, FIG. 9 illustrates an example simplified procedure 900 for receiver side noise reduction and speech enhancement for PSTN callers in accordance with one or more embodiments described herein, particularly from the perspective of a receiver (e.g., conference/video call server/gateway, a conference/video call end user application, a one-on-one call end user receiver, etc.). For example, a non-generic, specifically configured device (e.g., device 200) may perform procedure 900 by executing stored instructions (e.g., process 248). The procedure 900 may start at step 905, and continues to step 910, where, as described in greater detail above, the receiver receives an audio codec stream (e.g., PSTN audio stream 610).

As detailed herein, in step 915, the receiver may determine a length of time associated with a look-ahead buffer of the audio codec stream. For instance, the length of time may be fixed, configured, determined, or variable and calculated. In one embodiment, for example, the length of time associated with the look-ahead buffer is based on a variable jitter buffer, where the receiver calculates the length of time based on one or more real-time factors of the audio codec stream (e.g., an amount of noise, an amount of packet loss, a number of audio enhancements to be applied, an amount of latency in the code stream, a processing capacity of the receiver during the audio codec stream, and so on).

In step 920, the receiver inputs the audio codec stream into an audio enhancement model (e.g., model 622) trained with one or more audio enhancements (e.g., noise reduction, wideband filling/bandwidth extension, artifact rectification, packet loss concealment, etc.). This causes the audio enhancement model to apply the one or more audio enhancements to the audio codec stream to generate an enhanced audio codec stream (e.g., enhanced audio stream 630) within the length of time associated with the look-ahead buffer of the audio codec stream.

Notably, where the jitter buffer is variable, as mentioned above, the audio enhancement model may be trained with a variable length of time, such that the audio enhancement model processes the audio codec stream based on the length of time associated with the look-ahead buffer according to the variable jitter buffer. Also, in one embodiment, the audio enhancement model may process the audio codec stream based on a number and/or type of the one or more audio enhancements to be applied to the audio codec stream within the length of time (e.g., specifically associated with the look-ahead buffer according to the variable jitter buffer).

Regarding the audio enhancement model used, different configurations and/or implementations are conceived herein. In particular, the audio enhancement model may be a singular model having a selectable application of particular audio enhancements to perform, or else there may be different models for the different combinations of enhancements desired. For instance, in one embodiment, the techniques herein may determine specific audio enhancements from a plurality of optional audio enhancements and select a particular model trained specifically on the specific audio enhancements. In another embodiment, the audio enhancement model may be trained based on a plurality of optional audio enhancements, such that the techniques herein may enter a selection of the desired audio enhancements into the audio enhancement model to cause the audio enhancement model to specifically apply the desired audio enhancements from the plurality of optional audio enhancements.

Returning to procedure 900, once the audio enhancement model has been applied to the audio codec stream, then in step 925 the receiver may output the enhanced audio codec stream (e.g., enhanced audio stream 630).

Note that in certain embodiments, one of the inputs to the audio enhancement model may be a particular user hearing profile, thus generating the enhanced audio codec stream specifically for the particular user hearing profile, as mentioned above. Also, in other embodiment, one of the inputs may be ambient receiver sound, and as such the techniques herein may determine audio impairments caused by the ambient receiver sound in order to counteract the audio impairments with the audio enhancement model to generate the enhanced audio codec stream specifically based on the audio impairments. Still other enhancements may be made according to the techniques herein, and those mentioned are merely examples of possibilities afforded by the present disclosure.

The simplified procedure 900 may then end in step 930, notably with the ability to continue ingesting and processing audio data. Other steps may also be included generally within procedure 900. For example, such steps (or, more generally, such additions to steps already specifically illustrated above), may include: detecting one or more public switched telephone network callers participating in a conference call, and activating the audio enhancement model to generate the enhanced audio codec stream for the conference call in response to having at least one public switched telephone network caller; activating the audio enhancement model to generate the enhanced audio codec stream for only the audio codec stream of a selected presenter on a conference call; and so on.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for receiver side noise reduction and speech enhancement for PSTN callers. That is, the techniques herein provide a data-driven method to perform background noise reduction (BNR) on the receiver side, particularly for PSTN incoming audio codec streams. In certain embodiments, also, the techniques herein advantageously allow the overlay of other audio enhancements within the audio enhancement model to complete such enhancements using the same compute budget (i.e., not cascading the enhancement techniques, but instead a singular audio enhancement operation).

According to the embodiments herein, an illustrative method herein may comprise: receiving, at a receiver, an audio codec stream; determining, by the receiver, a length of time associated with a look-ahead buffer of the audio codec stream; inputting, by the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and outputting, by the receiver, the enhanced audio codec stream.

In one embodiment, the one or more audio enhancements are selected from a group consisting of: noise reduction; wideband filling/bandwidth extension; artifact rectification; and packet loss concealment.

In one embodiment, the method further comprises: determining a particular user hearing profile; and inputting the particular user hearing profile into the audio enhancement model to generate the enhanced audio codec stream specifically for the particular user hearing profile.

In one embodiment, the method further comprises: determining ambient receiver sound; determining audio impairments caused by the ambient receiver sound; and counteracting the audio impairments with the audio enhancement model to generate the enhanced audio codec stream specifically based on the audio impairments.

In one embodiment, the method further comprises: determining the one or more audio enhancements from a plurality of optional audio enhancements; and selecting a particular model trained specifically on the one or more audio enhancements as the audio enhancement model.

In one embodiment, the audio enhancement model is trained based on a plurality of optional audio enhancements, and method further comprises: entering a selection of the one or more audio enhancements into the audio enhancement model to cause the audio enhancement model to specifically apply the one or more audio enhancements from the plurality of optional audio enhancements.

In one embodiment, the length of time associated with the look-ahead buffer is based on a variable jitter buffer, and method further comprises: calculating the length of time based on one or more real-time factors of the audio codec stream. In one embodiment, the one or more real-time factors are selected from a group consisting of: an amount of noise in the audio codec stream; an amount of packet loss in the audio codec stream; a number of audio enhancements to be applied to the audio codec stream; an amount of latency in the code stream; and a processing capacity of the receiver during the audio codec stream. In one embodiment, the audio enhancement model is trained with a variable length of time, and wherein the audio enhancement model processes the audio codec stream based on the length of time associated with the look-ahead buffer according to the variable jitter buffer. In one embodiment, the audio enhancement model further processes the audio codec stream based on a number and/or type of the one or more audio enhancements to be applied to the audio codec stream within the length of time associated with the look-ahead buffer according to the variable jitter buffer.

In one embodiment, the method further comprises: detecting one or more public switched telephone network callers participating in a conference call; and activating the audio enhancement model to generate the enhanced audio codec stream for the conference call in response to having at least one public switched telephone network caller.

In one embodiment, the method further comprises: activating the audio enhancement model to generate the enhanced audio codec stream for only the audio codec stream of a selected presenter on a conference call.

In one embodiment, the receiver is selected from a group consisting of: a conference call server; a conference call gateway; a conference call end user application; a video call server; a video call gateway; a video call end user application; and a one-on-one call end user receiver.

According to the embodiments herein, an illustrative tangible, non-transitory, computer-readable medium herein may have computer-executable instructions stored thereon that, when executed by a processor on a computer, may cause the computer to perform a method comprising: receiving, at a receiver, an audio codec stream; determining, by the receiver, a length of time associated with a look-ahead buffer of the audio codec stream; inputting, by the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and outputting, by the receiver, the enhanced audio codec stream.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: receive, as a receiver, an audio codec stream; determine, as the receiver, a length of time associated with a look-ahead buffer of the audio codec stream; input, as the receiver, the audio codec stream into an audio enhancement model trained with one or more audio enhancements to cause the audio enhancement model to apply the one or more audio enhancements to the audio codec stream to generate an enhanced audio codec stream within the length of time associated with the look-ahead buffer of the audio codec stream; and output, as the receiver, the enhanced audio codec stream.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as such as for videoconferencing services, other suitable technologies, protocols, and associated devices may be used in accordance with the techniques described above, such as one-on-one video communication protocols (e.g., video calls). In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at a receiver, an audio codec stream, wherein the audio codec stream originates from a public switched telephone network (PSTN) caller;
determining, by the receiver and in real-time, a length of time associated with a look-ahead buffer of the audio codec stream;
inputting, by the receiver and in response to the audio codec stream originating from a public switched telephone network (PSTN) caller, the audio codec stream into an audio enhancement model trained with one or more audio enhancements to cause the audio enhancement model to apply the one or more audio enhancements to the audio codec stream to generate an enhanced audio codec stream specifically within the length of time associated with the look-ahead buffer of the audio codec stream as determined in real-time; and outputting, by the receiver, the enhanced audio codec stream.

2. The method as in claim 1, wherein the one or more audio enhancements are selected from a group consisting of: noise reduction; bandwidth extension; artifact rectification; and packet loss concealment.

3. The method as in claim 1, further comprising:
determining a particular user hearing profile; and
inputting the particular user hearing profile into the audio enhancement model to generate the enhanced audio codec stream specifically for the particular user hearing profile.

4. The method as in claim 1, further comprising:
determining ambient receiver sound;
determining audio impairments caused by the ambient receiver sound; and
counteracting the audio impairments with the audio enhancement model to generate the enhanced audio codec stream specifically based on the audio impairments.

5. The method as in claim 1, further comprising:
determining the one or more audio enhancements from a plurality of optional audio enhancements; and
selecting a particular model trained specifically on the one or more audio enhancements as the audio enhancement model.

6. The method as in claim 1, wherein the audio enhancement model is trained based on a plurality of optional audio enhancements, the method further comprising:
entering a selection of the one or more audio enhancements into the audio enhancement model to cause the audio enhancement model to specifically apply the one or more audio enhancements from the plurality of optional audio enhancements.

7. The method as in claim 1, wherein the length of time associated with the look-ahead buffer is based on a variable jitter buffer, the method further comprising:
calculating the length of time based on one or more real-time factors of the audio codec stream.

8. The method as in claim 7, wherein the one or more real-time factors are selected from a group consisting of: an amount of noise in the audio codec stream; an amount of packet loss in the audio codec stream; a number of audio enhancements to be applied to the audio codec stream; an amount of latency in the audio codec stream; and a processing capacity of the receiver during the audio codec stream.

9. The method as in claim 7, wherein the audio enhancement model is trained with a variable length of time, and wherein the audio enhancement model processes the audio codec stream based on the length of time associated with the look-ahead buffer according to the variable jitter buffer.

10. The method as in claim 9, wherein the audio enhancement model further processes the audio codec stream based on a number and/or type of the one or more audio enhancements to be applied to the audio codec stream within the length of time associated with the look-ahead buffer according to the variable jitter buffer.

11. The method as in claim 1, further comprising:
detecting one or more public switched telephone network callers participating in a conference call; and
activating the audio enhancement model to generate the enhanced audio codec stream for the conference call in response to having at least one public switched telephone network caller.

12. The method as in claim 1, further comprising:
activating the audio enhancement model to generate the enhanced audio codec stream for only the audio codec stream of a selected presenter on a conference call.

13. The method as in claim 1, wherein the receiver is selected from a group consisting of: a conference call server; a conference call gateway; a conference call end user application; a video call server; a video call gateway; a video call end user application; and a one-on-one call end user receiver.

14. A tangible, non-transitory, computer-readable medium having computer-executable instructions stored thereon that, when executed by a processor on a computer, cause the computer to perform a method comprising:
receiving, at a receiver, an audio codec stream, wherein the audio codec stream originates from a public switched telephone network (PSTN) caller;
determining, by the receiver and in real-time, a length of time associated with a look-ahead buffer of the audio codec stream;
inputting, by the receiver and in response to the audio codec stream originating from a public switched telephone network (PSTN) caller, the audio codec stream into an audio enhancement model trained with one or more audio enhancements to cause the audio enhancement model to apply the one or more audio enhancements to the audio codec stream to generate an enhanced audio codec stream specifically within the length of time associated with the look-ahead buffer of the audio codec stream as determined in real-time; and
outputting, by the receiver, the enhanced audio codec stream.

15. The tangible, non-transitory, computer-readable medium as in claim 14, wherein the one or more audio enhancements are selected from a group consisting of: noise reduction; bandwidth extension; artifact rectification; and packet loss concealment.

16. The tangible, non-transitory, computer-readable medium as in claim 14, wherein the method further comprises:
determining a particular user hearing profile; and
inputting the particular user hearing profile into the audio enhancement model to generate the enhanced audio codec stream specifically for the particular user hearing profile.

17. The tangible, non-transitory, computer-readable medium as in claim 14, wherein the method further comprises:
determining ambient receiver sound;
determining audio impairments caused by the ambient receiver sound; and
counteracting the audio impairments with the audio enhancement model to generate the enhanced audio codec stream specifically based on the audio impairments.

18. The tangible, non-transitory, computer-readable medium as in claim 14, wherein the method further comprises one of either:
determining the one or more audio enhancements from a plurality of optional audio enhancements and selecting a particular model trained specifically on the one or more audio enhancements as the audio enhancement model; or entering a selection of the one or more audio enhancements into the audio enhancement model to cause the audio enhancement model to specifically apply the one or more audio enhancements from the plurality of optional audio enhancements.

19. The tangible, non-transitory, computer-readable medium as in claim 14, wherein the length of time associated with the look-ahead buffer is based on a variable jitter buffer, and wherein the method further comprises:
calculating the length of time based on one or more real-time factors of the audio codec stream.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:

receive, as a receiver, an audio codec stream, wherein the audio codec stream originates from a public switched telephone network (PSTN) caller;

determine, as the receiver and in real-time, a length of time associated with a look-ahead buffer of the audio codec stream;

input, as the receiver and in response to the audio codec stream originating from a public switched telephone network (PSTN) caller, the audio codec stream into an audio enhancement model trained with one or more audio enhancements to cause the audio enhancement model to apply the one or more audio enhancements to the audio codec stream to generate an enhanced audio codec stream specifically within the length of time associated with the look-ahead buffer of the audio codec stream as determined in real-time; and output, as the receiver, the enhanced audio codec stream.

* * * * *